US010838384B2

(12) United States Patent
Sturm et al.

(10) Patent No.: US 10,838,384 B2
(45) Date of Patent: Nov. 17, 2020

(54) DEVICE FOR USE IN A CONFIGURABLE NETWORK

(71) Applicant: Melexis Technologies NV, Tessenderlo (BE)

(72) Inventors: Jörgen Sturm, Weimar (DE); Michael Bender, Erfurt (DE); Michael Frey, Erfurt (DE); Thomas Freitag, Plaue (DE)

(73) Assignee: Melexis Technologies NV, Tessenderlo (BE)

( * ) Notice: Subject to any disclaimer, the term of this patent is extended or adjusted under 35 U.S.C. 154(b) by 0 days.

(21) Appl. No.: 16/374,007

(22) Filed: Apr. 3, 2019

(65) Prior Publication Data

US 2019/0310597 A1 Oct. 10, 2019

(30) Foreign Application Priority Data

Apr. 6, 2018 (EP) .................................. 18166092

(51) Int. Cl.
*G06F 13/00* (2006.01)
*G05B 19/042* (2006.01)
(Continued)

(52) U.S. Cl.
CPC ....... *G05B 19/042* (2013.01); *G06F 13/4022* (2013.01); *G06F 13/4027* (2013.01);
(Continued)

(58) Field of Classification Search
CPC .. G06F 13/00; G06F 13/4022; G06F 13/4027; G05B 19/042; H04L 12/40169
See application file for complete search history.

(56) References Cited

U.S. PATENT DOCUMENTS 6,157,395 A * 12/2000 Alcorn ...................... G06F 3/14
345/504
2012/0221755 A1 8/2012 Schulz
(Continued)

FOREIGN PATENT DOCUMENTS

EP 2571200 A2 3/2013

OTHER PUBLICATIONS

Extended European Search Report from corresponding EP Application No. 18166092.9 dated Jun. 1, 2018.

*Primary Examiner* — Tim T Vo
*Assistant Examiner* — Kim T Huynh
(74) *Attorney, Agent, or Firm* — Workman Nydegger (57) ABSTRACT

A system having a plurality of devices configured in a daisy chain network including a communication bus connecting the devices and adapted to exchange address-setting information. Each device includes an input pin adapted to receive via an input signal line different from the communication bus a signal comprising configuration information for configuring at least the device; a configuration handling unit adapted to detect a configuration mode and to configure the device according to the configuration information; an indicator adapted to indicate whether the configuration handling unit has finished configuring the device; an output pin adapted to forward the configuration information to the daisy chain network when the indicator indicates the configuration of the device is done; and a safety handling unit adapted to be operable in a safety handling mode when the indicator indicates the configuration of the device is done.

12 Claims, 7 Drawing Sheets

(51) Int. Cl.
*G06F 13/40* (2006.01)
*H04L 12/40* (2006.01)

(52) U.S. Cl.
CPC ............... *H04L 12/40169* (2013.01); *G05B 2219/2231* (2013.01); *H04L 2012/40215* (2013.01); *H04L 2012/40234* (2013.01); *H04L 2012/40273* (2013.01)

(56) References Cited

U.S. PATENT DOCUMENTS

| | | |
|---|---|---|
| 2014/0223048 A1 | 8/2014 | Troeger |
| 2016/0364354 A1 | 12/2016 | Lin et al. |
| 2019/0166089 A1* | 5/2019 | Schmitz .............. H04L 12/4013 |

* cited by examiner

DEVICE FOR USE IN A CONFIGURABLE NETWORK

FIELD OF THE INVENTION

The present invention is generally related to the field of illumination and signalization systems. More specifically, it relates to the control of LED clusters via data transmission.

BACKGROUND OF THE INVENTION

Taillight or rear light system of today's cars contain several light sources with different functions, e.g. rear light, fog light, brake light, blinker, etc. Some of these lights perform safety related functions, e.g. brake lights. In case a brake light is not functioning properly, error information must be provided to a higher-level system or to any other subsystem forming part of the application in question. The higher-level system or other subsystem may then take further action.

Illumination systems, amongst other those for light applications in cars, often make use of LED technology. LED technology typically advantageously is used since the production of LED illumination sources is inexpensive and the energy consumption of LED illumination sources is low. Hence, also light sources in today's cars often apply LED lights arranged in one or more strings. These LED strings are controlled by one or more controlling ICs.

The controlling ICs in the LED units (slaves or slave nodes) communicate among each other and to a master controlling unit (master node) using a bus protocol in a network application. The protocol itself can be any protocol, e.g. a Local Interconnect Network (LIN) or a Controlled Area Network (CAN) or any other protocol. The master node itself might communicate also to another higher-level controlling unit of the system.

Obviously, there are space constraints present in taillights. Therefore, the various slave nodes should be small in dimension in order to follow the space constraints of for instance a PCB assembly. Consequently, small packages for the integrated circuits (ICs) of these slave nodes should be used. Small packages further have then constraints in the maximum allowed number of pins. Beside of that, also constraints in terms of costs of the slave nodes have to be taken into account: the smaller the package, the cheaper the slave node.

Errors in for instance brake lights can originate from sources of any nature. It could be that a LED in a string has got an open soldering, so that the string is not working anymore. Alternatively, it could be that the communication over the bus network is not working anymore e.g. because of a broken wire or because of a crashed protocol stack. The error conditions are monitored either by the slaves themselves, the master device or any additional higher-level unit (e.g. observer or observing unit), that for instance monitors the network traffic.

Characteristic in all that is that all the error conditions are summarized to a single piece of error information that might be transported to all members of the specific application (e.g. all slaves in a taillight, the master node, any observing unit) and/or to another higher-level unit in the car that must be aware of this error condition (e.g. the dashboard controller to indicate a warning). This single error information can be for instance a signal on a single wire or signal line.

A straightforward solution may be that this single error information is created by one member of the network and then provided to all members of the network via an additional single wire. This however requires an additional pin on each node. This also leads to an additional pin on the package and may require a bigger package and thus a possible space increase and a higher cost for each slave node.

Hence, there is a need for a solution wherein the need for this additional pin is avoided.

SUMMARY OF THE INVENTION

It is an object of embodiments of the present invention to provide for a system of devices configured in a daisy chain network that allows for exchanging error information over the network, wherein the use of a dedicated pin in each device for communication of the error information is avoided.

The above objective is accomplished by the solution according to the present invention.

In a first aspect the invention relates to a system comprising a plurality of devices configured in a daisy chain network, comprising a communication bus connecting said devices and adapted to exchange address setting information. Each device comprises
an input pin adapted to receive via an input signal line different from the communication bus a signal comprising configuration information for configuring at least the device,
a configuration handling unit adapted to detect a configuration mode and to configure the device according to the configuration information,
an indicator adapted to indicate whether the configuration handling unit has finished configuring the device,
an output pin adapted to forward the configuration information to the daisy chain network when the indicator indicates the configuration of the device is done,
a safety handling unit adapted to be operable in a safety handling mode when the indicator indicates the configuration of the device is done, for interconnecting by means of a switch the output pin and the input pin to form a signal line between the input pin and the output pin and for forwarding safety error information to the daisy chain network.

The proposed solution indeed allows avoiding an extra pin for exchanging the safety error information. This is achieved by providing in each device both a configuration handling unit and a safety handling unit which exploit internally in the device a same signal line. The configurable daisy chain network comprises a plurality of such devices. When in a configuration mode the signal line is used for configuration purposes. When the device has been configured, an indicator is set accordingly. When this is noted by the safety handling unit, the latter interconnects by means of a switch the input and output pin of the device to obtain a signal line between said input pin and said output pin. Via this interconnection safety error information can be received and forwarded to other devices in the network.

In preferred embodiments, the switch is controlled by a register arranged for enabling the safety handling.

Preferably, the safety handling unit is arranged to generate safety error information and to transmit the generated safety error information.

In typical embodiments, the system comprises a control unit to control said plurality of devices. In specific embodiments, the control unit acts as a master controlling unit and the various devices as previously described form slave nodes.

Advantageously, the master controlling unit are connected to a communication bus.

In embodiments of the invention, the system comprises an observing control unit arranged to observe communication between said master controlling unit and said plurality of devices. The observing control unit is preferably also arranged to generate additional safety information.

In another embodiment, the observing control unit is connected to said communication bus.

In advantageous embodiments, the system is a lighting system, e.g. an interior lighting system or a tail lighting system of a vehicle.

In another aspect the invention relates to a method for operating a system comprising a daisy chain network formed by a plurality of devices and a communication bus connecting the devices and adapted to exchange address setting information. The method comprises:
detecting with a configuration handling unit of a device in the daisy chain network that said device is in a configuration mode,
configuring said device based on configuration information received via an input signal line of said device different from the communication bus,
setting the indicator to indicate the device has been configured,
switching to a safety handling mode by establishing with a safety handling unit of said device interconnection of an input pin and an output pin by means of a switch so that a signal line is formed between the input pin and the output pin and safety error information can be forwarded to the daisy chain network.

In one embodiment, the method comprises generating safety error information when an error is detected and transmitting the generated safety error information.

In preferred embodiments, the method steps are carried out for each device of the configurable network.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The proposed invention offers a solution that allows transmission of safety error information while avoiding the use of a dedicated pin in each device of a configurable network.

Figure 1:
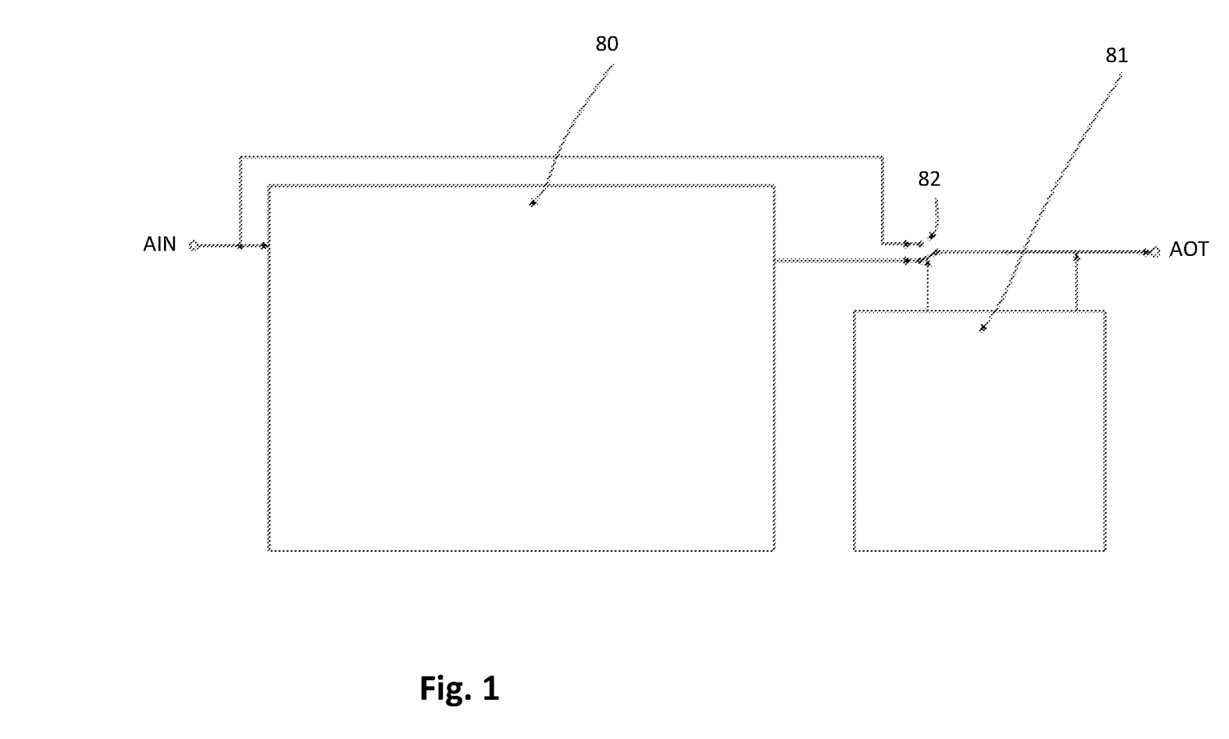
FIG. 1 illustrates a block scheme of a device according to the present invention.

The present invention discloses in a first aspect a system of devices capable of exchanging over a same signal line configuration information and safety information with other devices that form part of the same configurable network. The configuration information and the safety information are not necessarily related to each other. A basic block scheme of the device is shown in FIG. 1. The device comprises an input pin (AIN) via which the device receives configuration information that was sent via the signal line. The device comprises a configuration handling unit (80) that, based on the configuration information, can configure the device, e.g. to assign a network address to the device via e.g. a dedicated communication interface and a bus. After configuration of the device an indicator is set showing that the device is now operable and ready to enter an application mode. The received configuration information may then be forwarded to a next device via an output pin (AOUT), which on its turn can be configured and so on. Once the device is in application mode, a safety handling unit (81) can become active. By changing the switch (82) this unit connects the input pin (AIN) and the output pin (AOUT) to a single signal line. The safety handling unit (81) can now transmit safety error information. In case an error has occurred outside the device, i.e. in another part of the system the device is part of, the device, i.e. the slave node, receives this information so that measures can be taken. Alternatively, the safety error information is generated in the safety handling unit itself in case an error is detected in the device. Via the switch (82), controlled and enabled by the safety handling unit (81), the safety error information is forwarded via the output pin (AOUT) to other devices being part of the network.

In a preferred embodiment, the system is formed by a plurality of such devices connected in a daisy chain. The system comprises a control unit to which the devices of the daisy chain may be connected via a communication bus. The various devices of the daisy chain can then be seen as slave nodes of the system and the control unit acts as a master controlling unit. The control unit may comprise a communication interface, to which the bus for the slave nodes is connected. The control unit might also comprise a further communication interface, to connect some higher-level controlling unit which may then further be connected to another dedicated network, e.g. a CAN network.

The system may for example be a lighting system for use in a vehicle or automotive, although the invention is not limited thereto. In one embodiment, it is a taillight system or an interior light system of a vehicle. Obviously, the invention is not limited to those examples.

Figure 2:
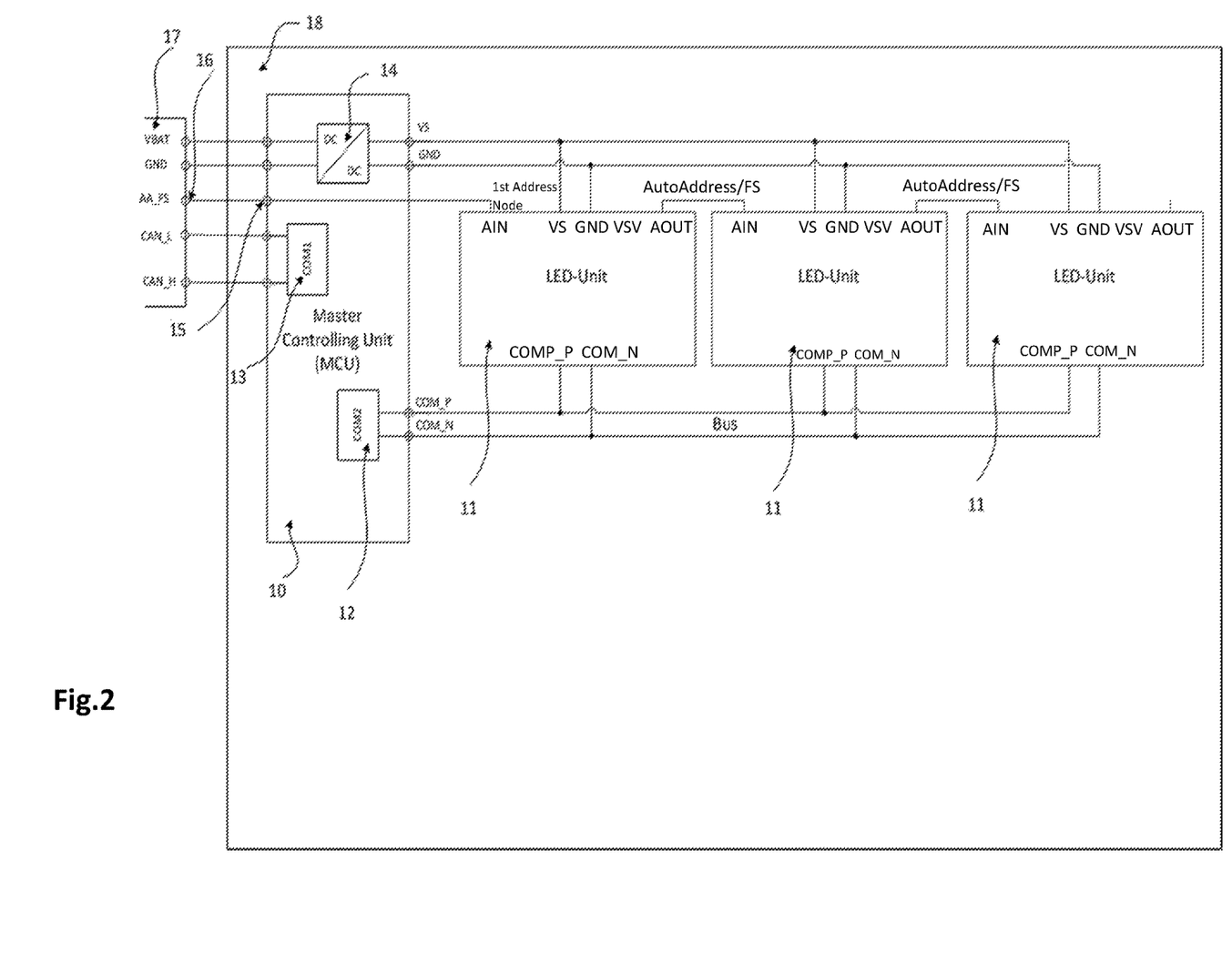
FIG. 2 illustrates an embodiment of a system comprising a plurality of devices as slave nodes and a master controlling unit.

FIG. 2 illustrates an example of a system comprising a master controlling unit (10) and a number of devices (11) according to the invention acting as slave nodes and connected to the master controlling unit via a communication bus. The devices are in this embodiment implemented as LED units. The LED units have as main task to provide LED lighting in the part of e.g. the vehicle. Note, however, that this is only one possibility and that embodiments of the invention equally apply to other types of electronic devices, e.g. other types of lighting devices. The master controlling unit (10), the slave nodes (11) can be arranged on one or more printed circuit boards (PCBs) (18). If present, also a module connector (17) can be arranged on one of those PCBs.

The bus transports information from the master controlling unit (10) to the LED units (11). In the case of a lighting system as in FIG. 2 this information can for example relate to light intensity, light colour or PWM (Pulse Width Modulation) ratios related thereto. Note that instead of PWM also other pulse modulation techniques can be used to control LEDs. The bus may transport as well diagnostic information exchanged between the master controlling unit (10) and slave units (11), e.g. to indicate whether LEDs carry a given current. The bus is then bidirectional. The bus also supports an address setting (auto configuration) protocol from the master controlling unit to the slave nodes.

The communication bus may be of any kind, however a differential bus with two wires (e.g. COM_P, COM_N) is a preferred implementation. Such buses can provide the required communication speeds, as well as communication with a high number of slave nodes, particularly in automotive applications including embodiments of the present invention.

In the system shown in FIG. 2 the master controlling unit comprises a communication interface COM2 (12), to which the bus for the slave nodes is connected. The master controlling unit further comprises a communication interface COM1 (13), to which a higher-level controlling unit is connected via a module connector (17) to a second dedicated network. This can for instance be a CAN network (CAN_L, CAN_H). The connector might carry as well the battery supply (VBAT and GND).

The master controlling unit in the embodiment of FIG. 2 further comprises a DC/DC converter (14) to convert the battery supply of the vehicle to a supply used by the slave nodes.

As none of the slave nodes carries any address information before assembling them into a network, the slave nodes in the daisy chain must each receive a unique address information via the bus during a configuration cycle (auto configuration). The system is therefore adapted to perform such a flexible configurable auto-addressing scheme for assigning addresses to the slave nodes.

The signal line AA_FS (auto-addressing Functional Safety) between a higher-level control unit (e.g. a master control unit) and the input pin AIN of the first slave node of the daisy chain is used to convey configuration information towards to the daisy chain when one or more of the slave nodes are set in configuration mode. If a slave node is in configuration mode, it still needs to receive an address. Via the AIN pin logic information is received to enable the configuration sequence for a given slave. The address itself is conveyed via the bus. Via its output pin AOUT the first slave node is connected to the next slave node. This goes on until the end of the daisy chain is reached.

Figure 3:
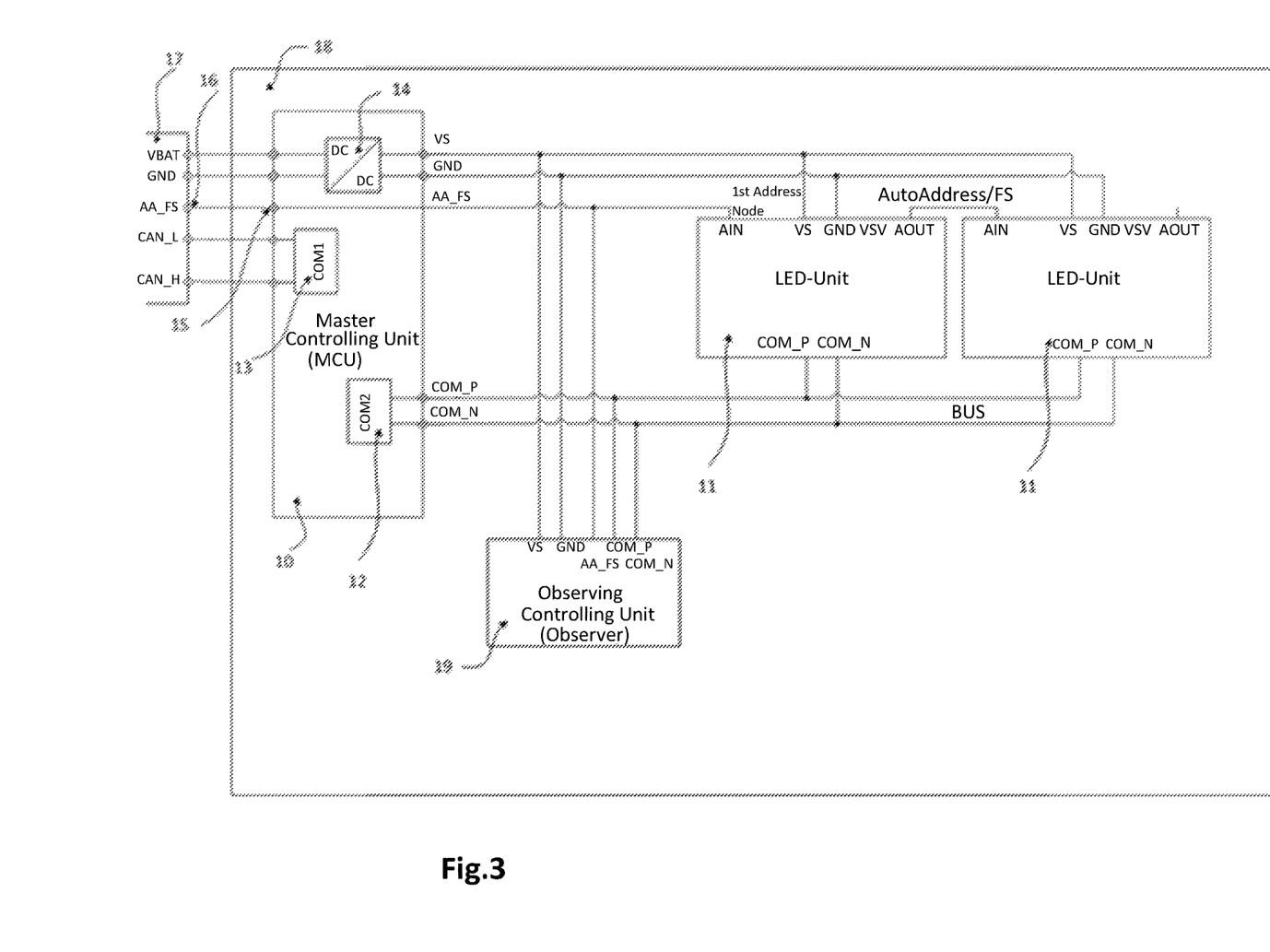
FIG. 3 illustrates an embodiment of a system further comprising an observing control unit.

In an embodiment as shown in FIG. 3 the device also comprises an observing control unit (19). This observing control unit (19) may be arranged as well on the PCB (18). The main task of the observing control unit is to observe the communication between the slave nodes and the master controlling unit. It also has access to the signal line AA_FS and preferably it can put safety related information on that signal line, in case it would detect an error in the exchanged communication.

One example of a safety critical application is a braking light. A malfunction in such a safety critical application should be diagnosed as soon as possible. The diagnostic information is preferably provided to a (or several) higher-level controlling unit(s) of the vehicle so that appropriate measures can be taken. Safety related errors can be of various nature:

A single slave may detect it is malfunctioning;
An observation controlling unit may detect the communication contains invalid information or there is no communication at all;
The master controlling unit can diagnose it is malfunctioning;
The master controlling node may diagnose that one or more slaves are malfunctioning or the communication to one or more slaves is malfunctioning;
In the present invention, it is proposed to communicate safety related information via a separate signal line (e.g. AA_FS) and not by using the bus communication in the system.

Safety related errors can occur on each connected member of the network. It can be for instance a single safety related error at e.g. one point in time on e.g. one given device. It can also be multiple errors on different devices at one point in time. However, the safety related errors are always put as error information to a single signal line. It is not important, if there is only one or more than one safety related error indicated on this single signal line. The master controlling unit might diagnose further under the use of the bus protocol running between the master controlling unit and the slaves, which slave device(s) has(have) generated which error information and what kind of error might have occurred. As the safety related errors are put on a single signal line, the separate signal (AA_FS) can carry in an application mode (i.e. not in configuration mode) the safety related error information (e.g. a voltage or a logic information), indicating that one or more errors are present. It may carry other information (e.g. another voltage or no voltage or an inverted logic information or a given signal signature), indicating that no error is present.

A method of operating a system comprising a daisy chain of devices according to this invention and a control unit is now described. Reference is made to the flow chart of FIG. 4.

Figure 4:
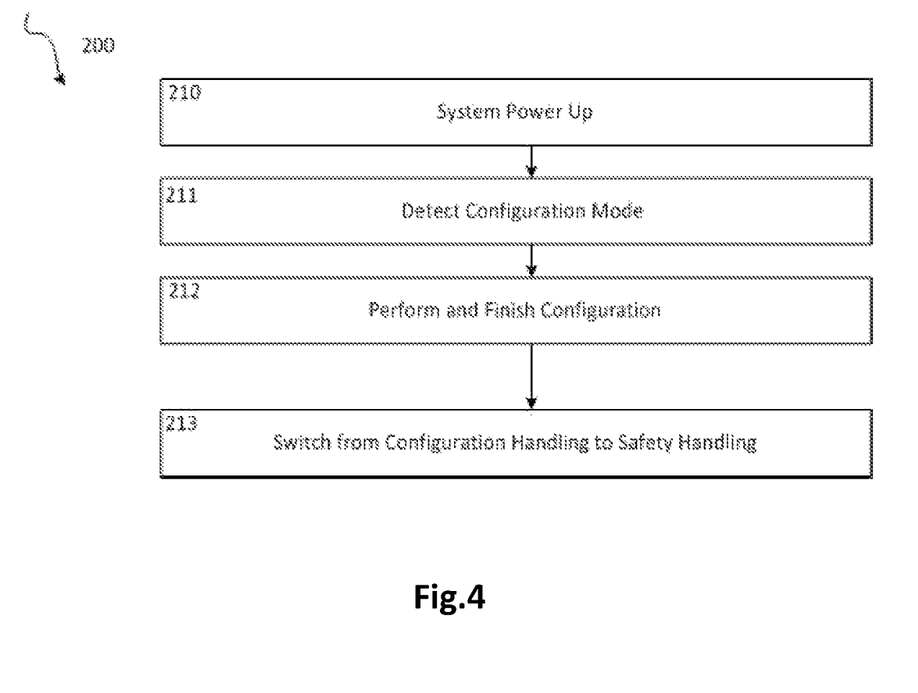
FIG. 4 illustrates a flow chart of a method for switching from configuration handling to safety handling.

After power-up of the system in step 210, the configuration handling unit (80) of a given slave node (11) detects (step 211) the configuration mode via a signal provided on the input pin (AIN) and an internal flag information in a non-volatile data memory of the slave node (11). The slave node next carries out the step 'Perform and Finish Configuration' (212). When the configuration is finished for a single slave node, a "configuration done flag" may be set in the non-volatile data memory of the slave node and e.g. a voltage information indicating that the configuration is finished, may be put to the output (AOUT), so that a next slave node can be configured applying the same steps.

When step 212 has been performed for all slave nodes of the daisy chain, a switch from configuration handling to safety handling follows in step 213. In this step a safety handling unit (81) provided in each slave node enables the safety handling and connects via a switching unit (82) the input (AIN) with the output (AOUT), so that a single signal line is established. Thus, after this step is applied by all slave nodes the daisy chain as such has changed its functionality to a single signal line connecting the slave nodes with the master controlling unit. In case a safety critical error is detected by a slave node, that slave node, more in particular the safety handling unit of that slave node, can provide an error information to said single signal line comprising the interconnected pins AIN and AOUT. In this way the error information can be distributed to the other slave nodes (and to the master unit and possibly also to a further higher-level control unit). Every component of the system can so put error information on the signal line, when it detects a safety related error. Further, any device of the system is able to read this signal line and find out if there is error information present.

As in the safety handling mode the pins AIN and AOUT of each slave node are interconnected and the slave nodes are also interconnected between each other by means of the input and output pins, a single signal line is built up, that may be connected to the master controlling unit (10) and/or to the module connector (17) and/or an observation controlling unit (19). The signal on this single signal line (e.g. AA_FS) can also be provided to a higher-level controlling unit. The higher-level controlling unit or any other units which are connected to the single signal line carrying the safety related error information, can further take any actions related to a safety related error.

It can be understood that at any time the safety handling unit (81) may set the switch (82) to enable the configuration cycle (auto configuration) again and when finished to set the switch to enable safety handling. Suppose that a new configuration sequence needs to be initialized. This can for example happen during maintenance. The new configuration sequence may be initialized e.g. by the master controlling unit (10) or by a higher-level controlling unit of the vehicle. Via the network the flags indicating a finished configuration may be erased in the non-volatile data memory. With a next system power up (step 210) the configuration handling unit (80) of a given slave node (11) can in a step 211 detect the configuration mode by a provided signal on an input (AIN) and by the internal flag information in the non-volatile data memory of the slave node (11).

In the devices of the system according to the invention one IC pin is saved. Hence, the slave node can be of lower cost and smaller in area.

Figure 5:
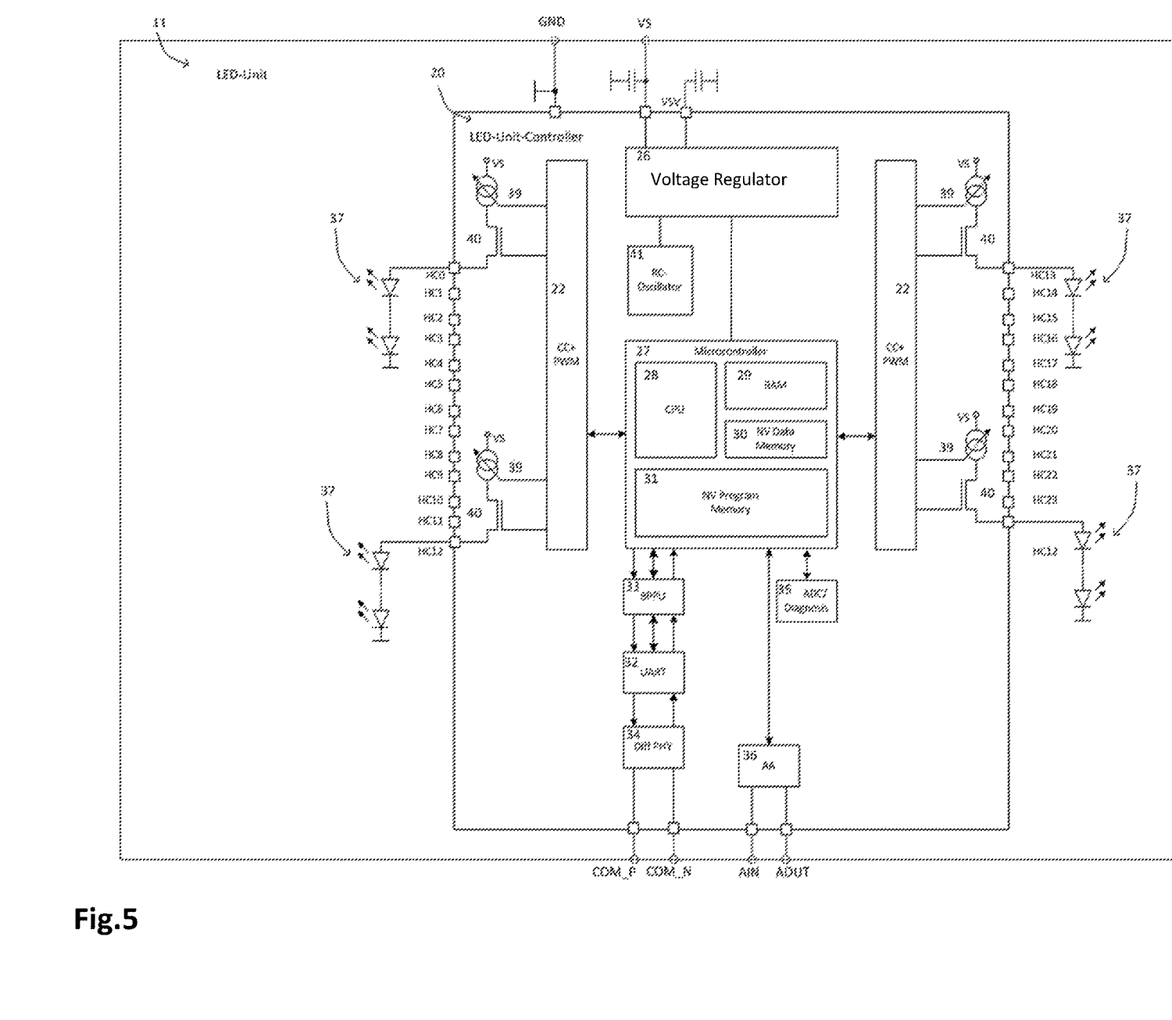
FIG. 5 illustrates a more detailed view on an embodiment of a device according to the invention.

FIG. 5 shows a more detailed view of an embodiment of the device of this invention. The LED unit controller (20), which in a preferred embodiment is an integrated circuit (IC), comprises one or more switch element, current source and PWM controls (22). The microcontroller (27) provides to the included pulse width modulation (PWM) registers frequency and duty cycle information. The frequency and duty cycle can be different in all PWM registers. It can also be a static on/off. To each PWM register a current source (39) and a switch element (40) are connected, which can carry the provided PWM or a static on/off. The microcontroller further provides current source information equivalent to DC current values that the connected current sources will apply. Each current source can carry a different DC current. Each current source further can be modulated with a PWM, which is provided via the connected PWM register. The switch element (40) and the current source (39) can be connected to one or more light emitting diodes, LEDs, (37) and can therefore drive the LEDs. The LEDs driven by one adjustable current source and the PWM controlled switch element may be in series connected forming an LED string. As each LED string can be controlled individually via the switch element and the current source and both can be modulated with a PWM or can be driven in static way by means of a DC current, each LED string can carry an individual light intensity, that can reach from 0% to 100% light output per LED. Combining the switch elements together with the current sources allows an optimal control of the LEDs in terms of power dissipation in the LED unit controller.

The LED unit controller further comprises a voltage regulator (26) to regulate the external supply voltage VS down to lower voltages needed in the integrated circuit. An RC-oscillator, optionally adjustable in its frequency, provides a system clock to the various elements of the LED unit controller that need a time base, e.g. the microcontroller (27), switch element, current source and PWM control (22), timers (not shown), etc. . . .

A microcontroller (27) comprises a central processing unit (CPU) (28) that is arranged to perform calculations and receives/provides information via an address or data bus to the connected units. The central processing unit (CPU) further receives interrupts, that might have an immediate or a future influence on processes handled by the CPU. The microcontroller further comprises a random-access memory (RAM) (29) wherein data is stored that is needed for processing. Such data can for instance be PWM ratios for the different PWM registers, which are calculated on the fly out of light intensity requests provided, for instance, by the master controlling unit (10).

The microcontroller further comprises a non-volatile (NV) program memory (31) wherein the instructions for the CPU are stored. Such a memory can be for instance a read only memory (ROM) or a flash memory. A non-volatile data memory (30), e.g. an EEPROM, contains data like e.g. calibration data, address information, status information, etc. The nature of these NV memories is that they do not lose the data, when the supply goes down.

An analogue to digital converter (ADC)/diagnostic unit (35) can e.g. measure and collect voltages from one or more pins of the LED unit controller. It further can also measure e.g. currents running through the connected LEDs. Instead of an ADC, also e.g. comparators with programmable thresholds can be used for the same purpose. The derived voltages or currents can be interpreted in the diagnostic unit (35) itself or the values are given to the microcontroller (27) and the diagnosis may be performed there. As the LED unit controller is in a preferred way implemented as an integrated circuit, the PWM control and ADC measurements can be synchronized between each other, so that measurements errors due to PWM switching can be eliminated. Further the ADC/diagnostic unit may also contain a temperature sensor to provide temperature information of the integrated circuit. The ADC/diagnostic unit can be read at any time by the CPU. The CPU may provide a check on the measurement results and compare them with predicted values (thresholds), that are available e.g. in the non-volatile data memory or that are provided via the master control unit. If the measurement values are above or below given thresholds, the CPU can trigger for instance error handling routines or might start a regulation process, so that the system is brought back to a normal operation condition. If the integrated circuit temperature is e.g. too high, the CPU can start to switch to a current saving mode or could start to dim the connected LEDs down. Security measures of the specific slave node may be communicated towards the master controlling unit, in which case the master controlling units may trigger then other slave nodes for other measures, so that the overall system performance is lowered. Some of these errors might be safety related.

A differential physical layer (34) is connected to the differential bus signals COM_P, COM_N and transforms these external bus signals into internal signals receive (RX) and transmit (TX) used by the LED unit controller. The differential physical layer protects the integrated circuit against electrostatic discharge (ESD) and electromagnetic compatibility (EMC) influences from the automotive harness and takes measures for the overall EMC compliance.

A bus protocol processing unit (BPPU) (33) performs the processing of the data to be received/transmitted, applies functional safety measures, triggers error handling if needed. The BPPU also generates interrupts and control signals to the CPU and the universal asynchronous receiver transmitter UART (32). The overall implementation allows the needed resources of the CPU to be low. The BPPU can be realized e.g. as a digital state machine.

The communication interface (12) of the master controlling unit (10) together with the communication interfaces (32, 33, 34) of the slave nodes (20), form a differential, bidirectional bus. Over this bus the light information, calibration data as well as diagnostic information is transported.

To control each LED (37) or LED string individually, each slave node (20) needs to have a unique address. This unique address should match to a physical position of each slave node (20) so that the light information given by the master controlling unit (10) arrives on the correct slave located in a given physical location, e.g. position 1=address a, position 2=address b and so on. The addresses must be given by the master controlling unit (10) after the power-up of the master and slave nodes.

In one embodiment the addresses as well as the ID flag are stored by each slave node (20) locally in a non-volatile manner in a non-volatile data memory (30) and may be used next in the application. A removal of supply does not affect the provided addresses.

During maintenance of the car, a reprogramming of these individual addresses may be needed, thus the address assignment method must be reversible, i.e. it must be possible to overwrite old addresses with newly assigned address values.

Figure 6:
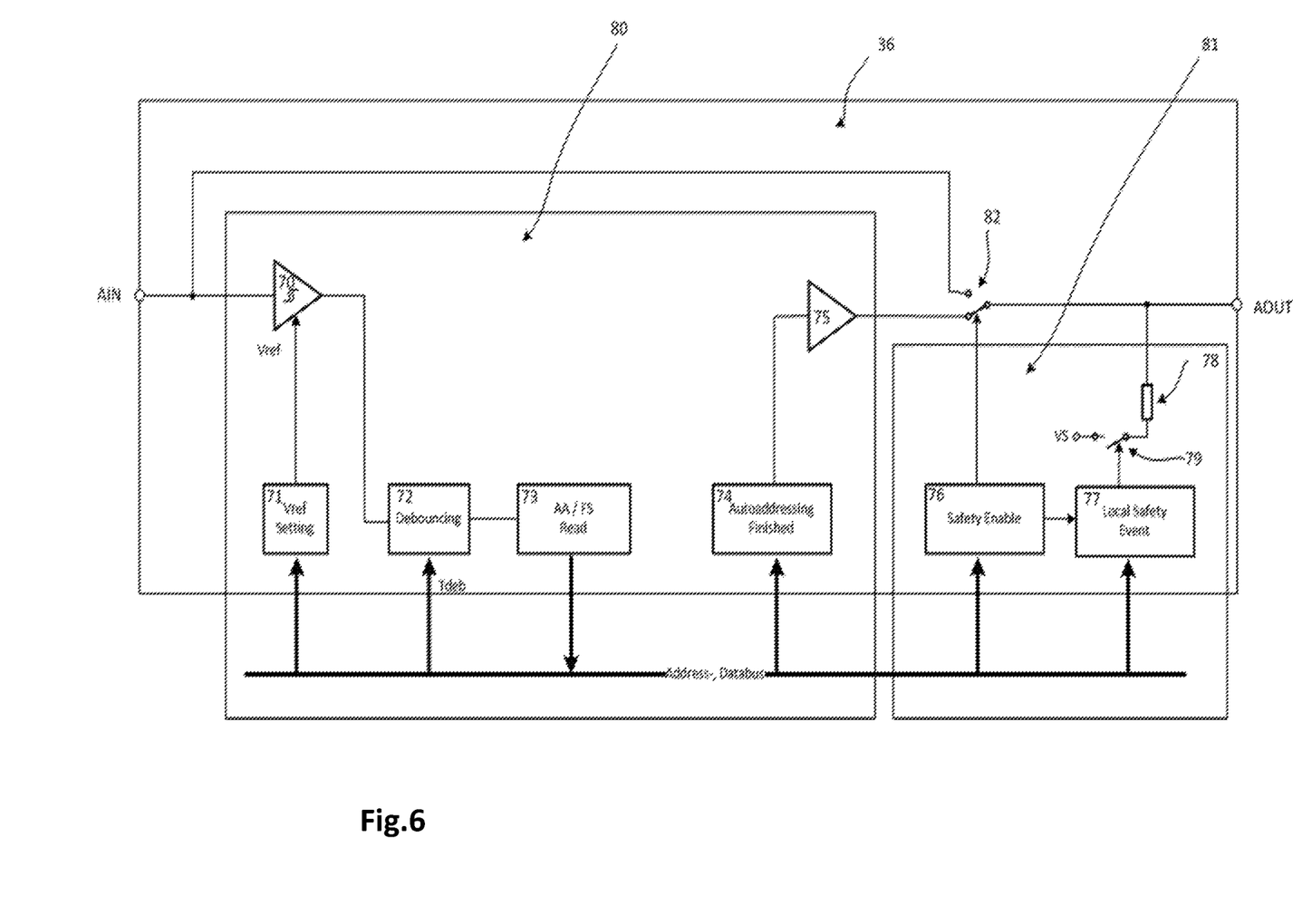
FIG. 6 illustrates a detail of the auto-addressing block shown in FIG. 5.

In the auto-addressing control block (36), shown more in detail in FIG. 6, the information provided on a pin AIN is read by a comparator with adjustable threshold (70), e.g. by a Schmitt-Trigger, whereof the threshold of this comparator can be set by the CPU (28) in a register (71). The information is then further given to debouncing unit (72), with a debouncing time that is adjustable by the CPU (28). After a debouncing time, the information arrives in a read register for configuration/safety information (73), which can be read by the CPU (28). The CPU (28) further can write to an auto addressing finished register (74), so that a pin driver (75) provides a voltage level via a switchable element (82) to the pin AOUT, which will be interpreted by a following slave node (20). The switchable element (82) is controlled by a safety enable register (76).

In auto-addressing mode the safety handling is not enabled by the safety enable register (76), thus the switchable element (82) always transports the voltage information from the pin driver (75) to the output pin AOUT. Also, local safety events are not diagnosed, so that the local safety event register (77) will not be triggered by the microcontroller. Another switchable element (79) therefore remains off.

The AIN pin of the first slave is connected to an active voltage level in an external manner as shown in FIG. 2. Together with a non-programmed ID flag in the NV data memory (30), the address assignment is possible for this first slave node.

In case slave nodes are not assigned with an individual address, the ID flags of these salve nodes are not programmed and the pins AOUT of these slave nodes do not carry an active voltage level, so that address assignment for slave nodes positioned behind such a non-programmed slave node in the daisy chain is not possible.

Figure 7:
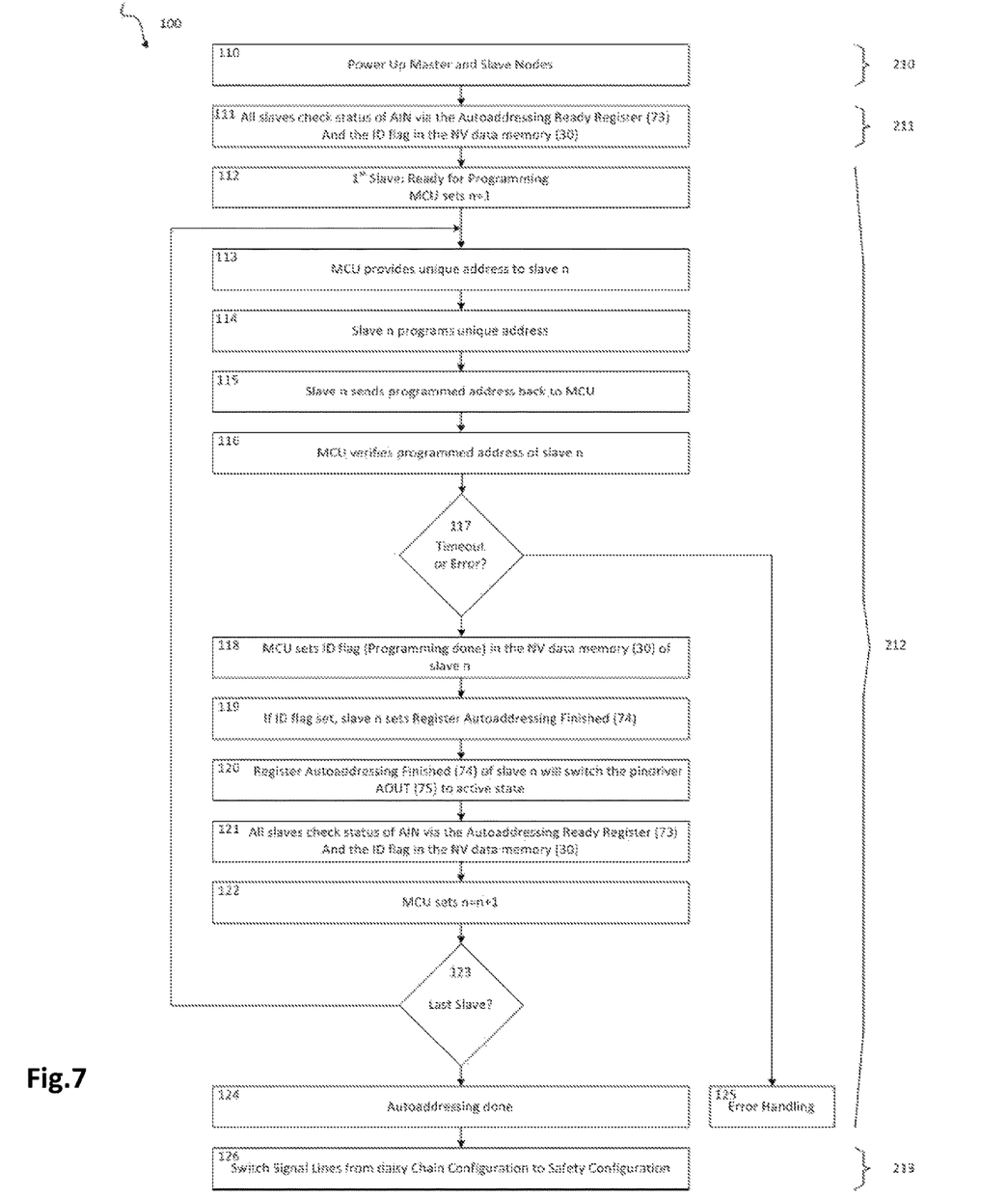
FIG. 7 shows a more detailed flow chart of the method of FIG. 4.

Disclosed is now a method (100) for providing a unique address to each slave node out of a number of identical slave nodes connected to a single master unit in a network configuration and after finishing the configuration a reconfiguration of the device for a safety related use. A flow chart of an embodiment of the method is shown in FIG. 7. Note that this figure repeats FIG. 4, but with more details.

The slave nodes each comprise a serial differential communication interface, an input pin AIN for receiving the information indicating the slave node is ready to receive an address information to be programmed from the master controlling unit, an output pin AOUT for providing the status information, that the address programming of the given slave node has been done and a configuration memory to store the address information and an ID flag, when programming has been done. The input pin of the first slave AIN1 is connected to an active voltage level for programming (e.g. a supply voltage), the output AOUT1 of the first slave is connected to the input AIN2 of the second slave and the output AOUT2 of the second slave is connected to the input AIN3 of the third slave and so on. The slaves are forming a daisy chain in the auto-addressing mode.

After the first power-up of master and slave nodes in step 110, the slave nodes check (step 111) the status of AIN and the ID flag in the NV data memory.

As the ID flags are not programmed, the slave nodes 200 detect the configuration mode. The safety handling is not enabled by the safety enable register (76). The first slave node is in addressing mode as its input AIN1 has an active voltage level and the ID flag has not been programmed. The master controlling unit 112 sets a general variable n=1, which indicates the slave node being assigned an address. In one embodiment slave node n might send a "READY FOR PROGRAMMING" message to the master controlling unit. The master controlling unit sends (step 113) a unique address to slave node n.

Slave node n programs the unique address in step 114. After that the address has been programmed the following occurs.

In one embodiment slave node n transmits in 115 its programmed address back to the master controlling unit, so that the master controlling unit is able to verify that address (step 116).

In another embodiment the slave node n verifies the address provided by the master controlling unit versus the programmed address and sends an acknowledge signal to the master controlling unit if the verification was successful. The master controlling unit checks the presence of such a signal.

If the programming was not successful during verification in step 116 or if the slave node has not transmitted the programmed address or an acknowledge signal back within a given time (step 117), the programming sequence might trigger in step 125 an error handling.

In one embodiment of the error handling the programming might be repeated for slave node n or for all slave nodes.

In one embodiment the master controlling unit may set in step 118 the ID flag of slave node n to "PROGRAMMING DONE", if the programming was successful.

In another embodiment, the slave node n might set its ID flag of to "PROGRAMMING DONE", if the programming was successful.

If the ID flag of slave node n is set to "PROGRAMMING DONE", the CPU of slave node n sets in 119 the register auto addressing finished (74), which will switch the pin driver AOUT to active state (step 120). By doing that, slave node n leaves the programming mode.

All slave nodes check in a continuous manner the status of AIN and the ID flags in the NV data memory (step 121). A next slave node in the daisy chain detects a valid active voltage level on AIN and an ID flag not programmed condition.

The master controlling unit increases in 122 the variable n to n+1.

The master control unit checks in step 123 if the last slave is programmed. If this condition is reached, the auto addressing routine is finished (124) and the master control unit might switch the system from auto addressing into functional (application) mode.

In one embodiment the master control unit checks, if a slave node number n is smaller or equal than a known last slave node number.

In another embodiment, the said "READY FOR PROGRAMMING" message must be transmitted by slave node n within a time frame. If there is no message within this time frame, the auto addressing is also interpreted to be finished.

After the auto addressing has been done, the microcontroller may switch in 126 the signal lines from daisy chain configuration to safety configuration. The safety enable register (76) will be set, the switchable element (82) will connect the input pin AIN and the output pin AOUT establishing a single signal line. The slave nodes will start to diagnose safety related errors.

In case a safety related error will be detected (e.g. an LED string does not carry any current anymore), the local safety event register (77) might be triggered by the microcontroller, so that a switchable element (79) might put an active voltage level (e.g. VS) via an optional resistive element (78) on this established signal line.

The signal line can be read by any member of the system (all slave nodes, master controlling unit, higher-level controlling unit, observer, etc.) so that additional measures can be taken.

In a further embodiment of the invention, the switchable element 82 and 79 are not present. In that case the safety enable register would enable a safety handling under use of the present daisy chain. A logic information on AIN is read by the microcontroller and the same logic information is transferred to AOUT. This implementation allows only a communication of a safety related error from the master controlling unit (10) or a higher-level controlling unit to all slave nodes. The slave nodes might take measures in order to react on the safety related error information. The slave nodes themselves are not able to put a safety related error on this signal line.

In embodiments of the invention the safety handling unit (81) may provide a voltage equal to supply voltage or ground voltage or any voltage between supply and ground voltage. It may also provide a logic information or a signal signature as for instance a known oscillation frequency if a safety related error is present. This signal information for a safety related error is known by all nodes of the system. In the opposite case, i.e. when the signal information indicates there is no safety related error present, is also known by all system nodes.

The selection of the signals, if there is a safety related error present or not, is done in such a way, that under all conditions (e.g. electromagnetic disturbances, ground shifts, temperature influences, number of connected modules, length of the single signal line, etc.) a reliable information on whether a safety related error is present or not, can be diagnosed by the nodes of the system.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising:
    a plurality of devices configured in a daisy chain network; and
    a communication bus connecting said devices and adapted to exchange address-setting information,
    wherein each of said devices includes:
        an input pin adapted to receive via an input signal line different from said communication bus a signal comprising configuration information for configuring at least said device,
        a configuration handling unit adapted to detect a configuration mode and to configure said device according to said configuration information,
        an indicator adapted to indicate whether said configuration handling unit has finished configuring said device,
        an output pin adapted to forward said configuration information to said daisy chain network when said indicator indicates the configuration of the device is done, and
        a safety handling unit adapted to be operable in a safety handling mode when said indicator indicates the configuration of the device is done, for interconnecting by means of a switch said output pin and said input pin to form a signal line between said input pin and said output pin and for forwarding safety error information to said daisy chain network.

2. The system as in claim 1, wherein said switch is controlled by a register arranged to enable the safety handling.

3. The system as in claim 1, wherein said safety handling unit is arranged to generate further safety error information and transmitting said generated safety error information.

4. The system as in claim 3, comprising a master controlling unit adapted to control said plurality of devices.

5. The system as in claim 4, wherein said master controlling unit is connected to said communication bus.

6. The system as in claim 4, comprising an observing control unit arranged to observe communication between said master controlling unit and said plurality of devices.

7. The system as in claim 6, wherein said observing control unit is arranged to generate additional safety information.

8. The system as in claim 6, wherein said observing control unit is connected to said communication bus.

9. The system as in claim 1, wherein said system is a lighting system.

10. A method for operating a system, the system comprising a daisy chain network formed by a plurality of devices and a communication bus connecting said devices and adapted to exchange address-setting information, the method comprising:
    detecting with a configuration handling unit of a device in said daisy chain network that said device is in a configuration mode,
    configuring said device based on configuration information received via an input signal line of said device different from said communication bus,
    setting said indicator to indicate said device has been configured,
    switching to a safety handling mode by establishing with a safety handling unit of said device interconnection of an input pin and an output pin by means of a switch so that a signal line is formed between said input pin and said output pin and safety error information can be forwarded to said daisy chain network.

11. The method for operating a device as in claim 10, further comprising generating safety error information in said device when an error is detected and transmitting said generated safety error information.

12. The method for operating a device as in claim 10, wherein the method steps are carried out for each of said devices of said configurable network.

* * * * *